United States Patent
Inoue et al.

(10) Patent No.: US 10,520,386 B2
(45) Date of Patent: Dec. 31, 2019

(54) VIBRATION MEASUREMENT DEVICE AND METHOD FOR HIGH-SPEED ROTATING MACHINES

(71) Applicant: MITSUBISHI HEAVY INDUSTRIES ENGINE & TURBOCHARGER, LTD., Sagamihara-shi, Kanagawa (JP)

(72) Inventors: Tomoaki Inoue, Tokyo (JP); Katsuya Yamashita, Tokyo (JP); Rimpei Kawashita, Tokyo (JP); Hiroshi Nakagawa, Tokyo (JP); Nariaki Seike, Tokyo (JP); Noriyuki Hayashi, Tokyo (JP); Hideo Mori, Tokyo (JP)

(73) Assignee: MITSUBISHI HEAVY INDUSTRIES ENGINE & TURBOCHARGER, LTD., Sagamihara-Shi, Kanagawa (JP)

( * ) Notice: Subject to any disclaimer, the term of this patent is extended or adjusted under 35 U.S.C. 154(b) by 185 days.

(21) Appl. No.: 15/319,992

(22) PCT Filed: Jun. 27, 2014

(86) PCT No.: PCT/JP2014/067261
§ 371 (c)(1),
(2) Date: Dec. 19, 2016

(87) PCT Pub. No.: WO2015/198487
PCT Pub. Date: Dec. 30, 2015

(65) Prior Publication Data
US 2017/0138811 A1    May 18, 2017

(51) Int. Cl.
*G01M 1/18* (2006.01)

(52) U.S. Cl.
CPC ..................... *G01M 1/18* (2013.01)

(58) Field of Classification Search
CPC ........................................................ G01M 1/18
(Continued)

(56) References Cited

U.S. PATENT DOCUMENTS 4,648,622 A * 3/1987 Wada .................. B60G 17/0165
267/64.16
4,929,874 A * 5/1990 Mizuno .................. F16F 15/02
310/51

(Continued)

FOREIGN PATENT DOCUMENTS

CN    103743522 A    4/2014
JP    61-21443 A    1/1986

(Continued)

OTHER PUBLICATIONS

"224th Spring Design—3: Relationship between Load and Deformation on Compression Coil Spring," Misumi Corporation, retrieved online from http //koza.misumi.jp/lca/2005/09/224_3.html, Sep. 9, 2005, with an English translation thereof, pp. 1-4 (8 pages total).

(Continued)

*Primary Examiner* — Tarun Sinha
(74) *Attorney, Agent, or Firm* — Birch, Stewart, Kolasch & Birch, LLP

(57) ABSTRACT

This vibration measurement device is configured to measure the balancing vibration of the cartridge, a kind of rotating machines, who has a rotor and a cartridge body to support the rotor rotatably for variable operating speed, and is provided with a rigidly fixed support structure, acceleration sensors which detect the vibration of the cartridge, and a flat spring which elastically supports the cartridge with respect to the support structure and has a variable spring constant of elastic support.

7 Claims, 8 Drawing Sheets

(58) Field of Classification Search
USPC .......................................................... 73/460
See application file for complete search history.

(56) References Cited

U.S. PATENT DOCUMENTS

| | | | | |
|---|---|---|---|---|
| 2007/0044555 | A1* | 3/2007 | Busch | G01M 1/34 |
| | | | | 73/471 |
| 2007/0080035 | A1* | 4/2007 | Mikonaho | F16F 7/104 |
| | | | | 188/379 |
| 2009/0304525 | A1* | 12/2009 | Reinschke | F04B 35/045 |
| | | | | 417/53 |
| 2014/0224013 | A1* | 8/2014 | Rogalla | G01M 1/24 |
| | | | | 73/462 |

FOREIGN PATENT DOCUMENTS

| | | |
|---|---|---|
| JP | 6-82328 A | 3/1994 |
| JP | 11-201853 A | 7/1999 |
| JP | 2002-90249 A | 7/1999 |
| JP | 2000-28468 A | 1/2000 |
| JP | 4192996 B1 | 12/2008 |
| JP | 2009-25157 A | 2/2009 |
| JP | 2010-96036 A | 4/2010 |
| JP | 2010-96936 A | 4/2010 |

OTHER PUBLICATIONS

International Search Report and Written Opinion of the International Searching Authority (Forms PCT/ISA/210 and PCT/ISA/237) for International Application No. PCT/JP2014/067261, dated Sep. 2, 2014, with an English translation.

\* cited by examiner

VIBRATION MEASUREMENT DEVICE AND METHOD FOR HIGH-SPEED ROTATING MACHINES

TECHNICAL FIELD

The present invention relates to a vibration measurement device and method for high-speed rotating machines.

BACKGROUND ART

Conventionally, an unbalance correction method is known for correcting the unbalance of, for example, a rotor as disclosed in Patent Document 1, the rotor being included in a turbocharger to be installed in an engine of an automobile or the like and being configured to rotate by using exhaust gas from the engine as a power source.

Here, a typical turbocharger 100 is illustrated in FIG. 8.

The turbocharger 100 is configured to compress and supercharge supplied intake air into the engine, which increases power and improve efficiency of the engine. The rotor 101 rotates at an extremely high speed during the supercharging.

Such a turbocharger 100 generates excessive vibrations through the rotation of the rotor 101 if a large unbalance exists in the rotor 101, which may cause problems such as vibrations of portions that support the rotor 101 and noise resulting from the vibrations. Thus, for the turbocharger 100, the balance of the rotor 101 is extremely important. Here, in the manufacturing process of the turbocharger 100, for example, an unbalance of the rotor is corrected in a short period of time without disassembling the turbocharger 100, using a configuration in which torque is applied to the rotor 101.

Conventionally, in correcting the unbalance of the turbocharger, air which simulates the exhaust gas from the engine is used to rotate the rotor at predetermined operating speed. In a state in which the rotor is rotating, vibrational accelerations are detected by acceleration sensors, and a rotation phase of the rotor is detected by a phase detector. Adjustment of the balance of the rotor (the unbalance correction) is applied to the magnitude and phase of the unbalance of the rotor detected with the vibrational acceleration and rotation phase. Note that the balance adjustment is applied by cutting and removing (by machining or the like) portions of the rotor equal to the unbalance.

In Patent Document 2, for example, a method is disclosed in which a rigid table, on which a high-speed rotating device is mounted, is supported by springs and vibration is measured by load indicators or vibration measuring instruments. In this case, one to two natural frequencies can be set by the table and the springs, which enable steady balance adjustment regardless of any effects from individual variability in casings of respective workpieces.

CITATION LIST

Patent Documents

Patent Document 1: Japanese Unexamined Patent Application Publication No. 2010-96936A
Patent Document 2: Japanese Unexamined Patent Application Publication No. H06-082328A

SUMMARY OF INVENTION

Technical Problems

Regard to the conventional vibration measurement device, a supporting stiffness of the workpiece is fixed previously and response sensitivity for the unbalance vibration cannot be actively controlled. Thus, the accurate measuring of the unbalance vibration is not easy over a wide speed range.

Further, on a mass production line producing a large amount of products, it is difficult to directly attach acceleration sensors on the product and thus the acceleration sensors are attached on scrolls on the measurement device. In this case, the modal mass of the scrolls influence the acceleration sensors. Then, because the support of a cartridge body by the scrolls is line contact (a circumference of a spigot joint edge) and a contact area is small, vibration propagation can be weak and the support of the cartridge body by the scrolls can be partial. Further, since pressure is applied from outside of both scrolls on a balance bench, vibration insulating rubbers can be excessively hardened and flexible support may not be kept.

Moreover, since the support of the cartridge body differs from boundary conditions in practical operation (when attached to an engine), reaction forces of bearings do not simulate conditions of practical operation and flexible rotor balancing cannot be adequately conducted.

Further, in the vibration measurement method disclosed in Patent Document 2, in a case in which natural frequencies of support conditions are set to be lower than support conditions of practical operation, balance of rigid-body modes can be measured, but on the other hand, balance of elastic modes that can be observed in practical machines may not be adequately measured. Also, in another case in which the support conditions are tuned to the conditions of practical operation, the balance of the elastic modes can be measured, but the balance of the rigid-body modes described above cannot be measured.

The present invention provides a vibration measurement device for high-speed rotating machines and a vibration measurement method that can improve the accuracy of balancing vibration measurement and reduce the unbalance of the rotating machine.

Solution to Problems

According to a first aspect of the present invention, a vibration measurement device for high-speed rotating machines is for measuring balancing vibration of the rotating machines whose operating speed is variable, the rotating machine being a cartridge including a rotor that rotates about an axial line and a cartridge body that rotatably supports the rotor. Such a vibration measurement device includes: a rigidly fixed support structure; a vibration detection unit that detects vibration of the rotating machine; and an elastic support portion that elastically supports the rotating machine with respect to the support structure having a variable spring constant of whose elastic support.

According to a fifth aspect of the present invention, a vibration measurement method for measuring the balancing vibration of a rotating machine whose operating speed is variable, the rotating machine being a cartridge including a rotor that rotates about an axial line and a cartridge body that rotatably supports the rotor, includes the steps of: elastically supporting the rotating machine with respect to a rigidly fixed support structure, via an elastic support portion having a variable spring constant; rotating the rotating machine about the axial line; and detecting the vibration of the rotating machine.

According to the above-described vibration measurement device and method for the high-speed rotating machines, after setting the rotating machine to be supported elastically with respect to the rigidly fixed support structure via the elastic support portion, rotating the rotating machine about the axial line and detecting the vibration of the rotating machine allow the balancing vibration of the rotating machine to be measured for whose variable operating speed.

In this case, the rotating machine is flexibly supported by the elastic support portion and a spring constant of the elastic support portion is variable. Thus, the S/N ratio due to this can be improved and both vibration measurements for a balance of rigid-body modes with low-speed operation in which the spring constant does not function and balance of flexible rotor modes with high-speed operation under support conditions assuming a practical device can be continuously conducted on the same rotating machine by the same device. As a result, balance adjustments associated with both of the low-speed and the high-speed operations are possible, the accuracy of the balancing vibration measurement can be improved and the unbalance of the rotating machine can be reduced.

In this way, both workpieces on which rigid rotor balancing only should be conducted and on which flexible rotor balancing also should be conducted can be measured on the same production line, thus facilities can be reduced and productivity can be improved.

According to a second aspect of the present invention, the vibration measurement device for the high-speed rotating machines may also include a damping device that provides damping to the rotating machine with respect to the support structure.

In this case, damping characteristics can be changed and gives a damping feature to the measurement of elastic rotor balancing with the high-speed operation in addition to the elastic modes.

According to a third aspect of the present invention, in the vibration measurement device for the high-speed rotating machines, the elastic support portion may be provided with a clamp that supports the rotating machine in one of a mechanical manner or an electrical manner.

In this case, because the rotating machine is rigidly supported by the clamp in the mechanical or the electrical manner, stiffness between the rotating machine and the vibration detection unit can be increased and the vibration of the rotating machine can be transmitted better to the vibration detection unit.

Furthermore, because vibration noise other than that of the rotating machine can be reduced and the S/N ratio of a measurement value can be improved, quietness of the rotating machine installed in the practical vehicle can be accomplished with fewer facilities.

According to a fourth aspect of the present invention, in the vibration measurement device for the high-speed rotating machines, the vibration detection unit may be provided on the clamp.

In this case, because the vibration detection unit, such as acceleration sensors, is attached to the clamp that rigidly supports the rotating machine, the vibration of the rotating machine can be measured more accurately than a case in which the rotating machine is supported with line contacts by scrolls.

Advantageous Effects of Invention

According to the above-described vibration measurement device and method for the high-speed rotating machines, balancing vibration measurement for low-speed and high-speed operations can be conducted using the same vibration measurement device, the accuracy of the vibration measurement can be improved and the unbalance of the rotating machines can be reduced.

DESCRIPTION OF EMBODIMENTS

Below, a vibration measurement device and method for high-speed rotating machines according to an embodiment of the present invention are described with reference to the drawings.

Figure 1:
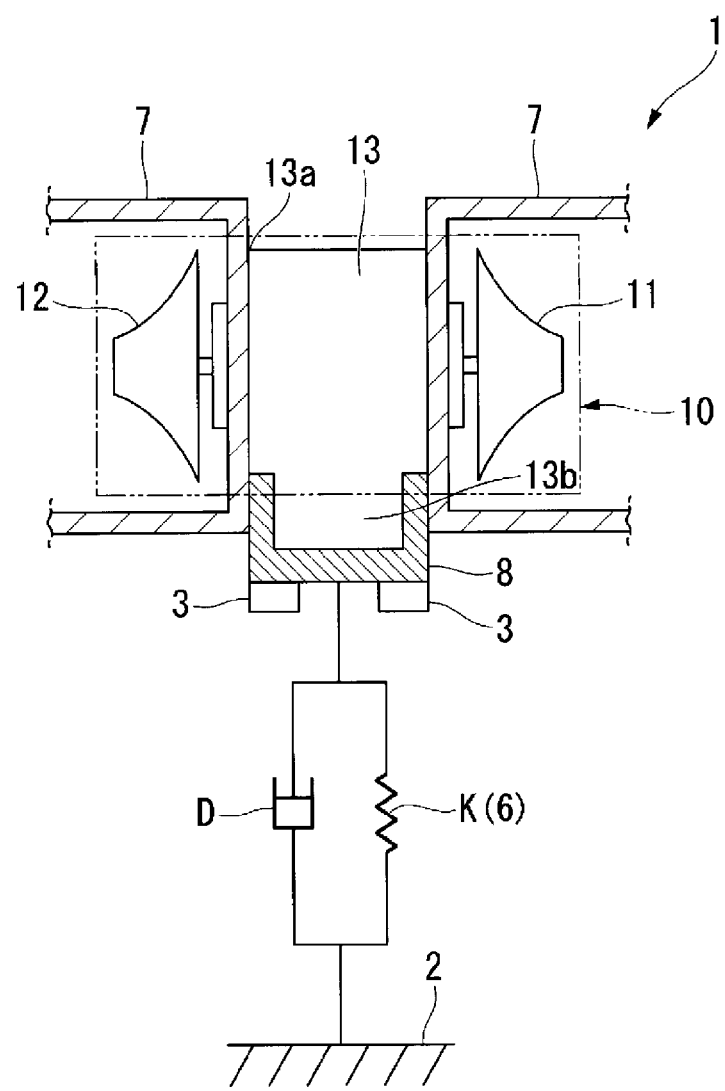
FIG. 1 is a schematic diagram illustrating a composition of a vibration measurement device according to an embodiment of the present invention.

As illustrated in FIG. 1, for production of a high-speed rotating machine such as a turbocharger, the vibration measurement device 1 according to the present embodiment is a device to adjust the balance of a cartridge 10, which is a rotating machine provided with a rotor.

The cartridge 10 is provided with rotors 11 and 12 that rotate about an axial line O and a cartridge body 13 that rotatably supports the rotors 11 and 12 via bearings (not illustrated). Of the cartridge 10, the rotors 11 and 12 are rotating portions and, supported such that the operating speed of the rotating portions is variable in the vibration measurement device 1 of the present embodiment. The cartridge 10 with the rotors 11 and 12 and the cartridge body 13 assembled together is set on the vibration measurement device 1.

The vibration measurement device 1 is provided with a rigidly fixed support structure 2, acceleration sensors 3 (a vibration detection unit) which detect the vibration of the cartridge 10, an elastic support portion K which elastically supports the cartridge 10 with respect to the support structure 2 and has a variable spring constant of elastic support, and a damping device D which applies damping for the cartridge 10 with respect to the support structure 2. Further, the elastic support portion K is provided with a spring constant varying mechanism 6 which enables the spring constant to be variable.

Here, FIG. 1 is a model diagram schematically illustrating the elastic support portion K which elastically supports the cartridge 10, and the damping device D which applies damping for the cartridge 10.

The cartridge 10 is supported with line contact by rubber scrolls 7 in an insulated state, along circumferential edges 13a that form spigot joint edges of the cartridge body 13 and a bottom 13b of the cartridge body 13 is rigidly supported by a clamp 8 in a mechanical or an electrical manner. The clamp 8 is formed of a material such as urethane, and supports the cartridge body 13 from below.

The support structure 2 is, for example, a base or the like fixed to the floor of a production line. The elastic support portion K provided with the spring constant varying mechanism 6 is provided on the support structure 2, and the cartridge body 13 of the cartridge 10 is elastically supported by the elastic support portion K.

The acceleration sensors 3 are used to detect the vibration of the cartridge 10 rotating and measure a conical mode, namely, a vibration component other than a parallel displacement of the shaft.

The elastic support portion K supports the cartridge 10 with respect to the support structure 2, via the clamp 8, and permits minute vibrations.

The damping device D is provided between the support structure 2 and the elastic support portion K.

The spring constant varying mechanism 6 is provided on the support structure 2, and changes the spring constant and the supporting stiffness of the elastic support portion K.

Next, effects of the vibration measurement device 1 whose composition is described above will be specifically described with reference to FIG. 1.

In the present embodiment, after setting the cartridge 10 to be elastically supported with respect to the rigidly fixed support structure 2 via the elastic support portion K, the balancing vibration of the cartridge 10 with variable operating speeds can be measured by rotating the cartridge 10 about the axial line and detecting the vibration of the cartridge 10.

Figure 2:
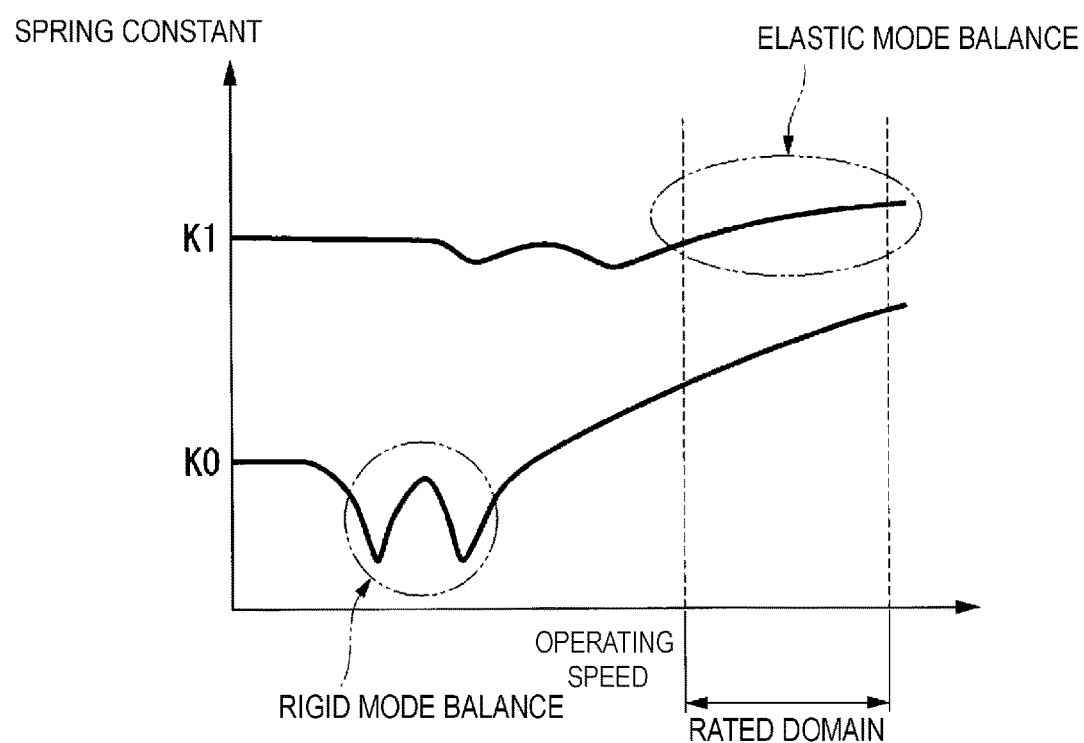
FIG. 2 is a diagram illustrating a relationship between dynamic stiffness and operating speed.

In this case, the cartridge 10 is elastically supported by the elastic support portion K, and the elastic property, namely the spring constant, can be adjusted by the spring constant varying mechanism 6. The S/N ratio can be improved by adjusting this elastic property, and, as illustrated in FIG. 2, one vibration measurement device 1 can continuously measure the balancing vibration of the same cartridge 10 with both of the different spring constants, namely, vibration measurement of rigid rotor balancing with low-speed on the elastic support in which the spring constant has no function (a spring constant K0) and vibration measurement of flexible rotor balancing with high-speed under environmental conditions simulating a practical machine (a spring constant K1).

This configuration allows balance adjustments to be appropriate for both of the low-speed and the high-speed operations, the accuracy of the balancing vibration measurement to be improved and the unbalance of the cartridge 10 to be reduced.

In this way, both a workpiece on which rigid rotor balancing only should be conducted (whose rated speed is lower than the speeds which generates elastic modes) and a workpiece on which flexible rotor balancing also should be conducted (models whose operating speeds generate elastic mode of them on practical vehicles) can be conducted for vibration measurement on the same production line. Thus, facilities can be reduced and productivity can be improved.

Further, in the present embodiment, the damping device D which applies damping to the cartridge 10 with respect to the support structure 2 is installed, enables the damping characteristic to be variable and gives a damping feature to the measurement of elastic rotor balancing with the high-speed operation in addition to the elastic modes. In this way, vibration characteristics of the cartridge 10 installed in the practical vehicle can be simulated more accurately.

In addition, in the present embodiment, because the cartridge 10 is rigidly supported by the clamp 8 in a mechanical or an electrical manner, stiffness between the cartridge 10 and the acceleration sensor 3 can be increased. As a result, the vibration of the cartridge 10 can be better transmitted to the acceleration sensor 3. Furthermore, vibration noise other than that of the cartridge 10 can be reduced and the S/N ratio of the measured value can be improved, thus offering the advantage that noise abatement of the cartridge 10 installed in the practical vehicle can be accomplished with fewer facilities.

In the vibration measurement device and method for the high-speed rotating machines according to the above-described embodiment, balancing vibration measurement for low-speed rotation and high-speed rotation can be performed using one vibration measurement device 1, the accuracy of the vibration measurement can be improved, and the unbalance of the cartridge 10 can be corrected and reduced.

Next, working examples of the vibration measurement device and method for the high-speed rotating machines according to the above-described embodiment are described below with reference to the attached drawings. Components and portions that are the same or similar to those of the above-described embodiment are assigned the same reference symbols and their descriptions are omitted, while compositions different to the embodiment are described below.

First Working Example

Figure 3:
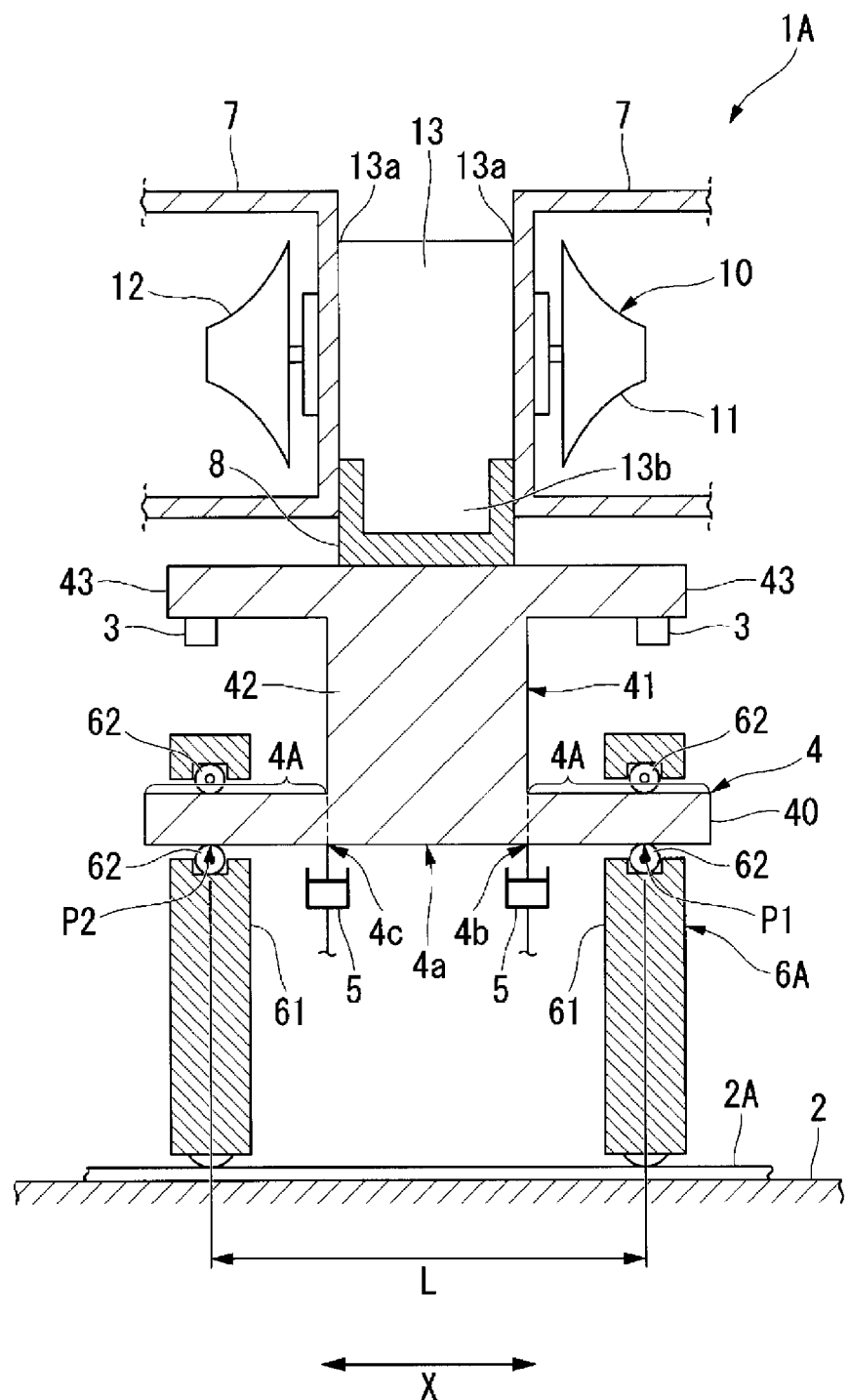
FIG. 3 is a schematic diagram illustrating a composition of a vibration measurement device according to a first working example.

As illustrated in FIG. 3, in a vibration measurement device 1A of a first working example, with respect to the cartridge 10, the clamp 8 is made of a material such as urethane, and supports the cartridge body 13 from below, with an intermediate component 41 positioned on the upper portion of a flat spring 4 (an elastic support portion) fixed onto the support structure 2.

The flat spring 4 supports the cartridge 10 with respect to the support structure 2, via the clamp 8, and permits minute vibrations. A thin plate-shaped spring body 40 and the intermediate component 41 formed standing on the center portion of a flat surface of the spring body 40 are integrally provided. Of the spring body 40, portions that laterally project from the base end portion of the intermediate component 41 are spring elements 4A.

The intermediate component 41 has a shaft 42, and protruding portions 43 that project in a horizontal direction X from the upper end portion of the shaft 42. The acceleration sensors 3 are fixed to bottom surfaces of the protruding portions 43 at the distal end portions thereof.

The two acceleration sensors 3 are used to detect the vibration of the cartridge 10 operating, and, because they are positioned such that respective distances from the shaft 42 in the horizontal direction X are secured, the conical mode, namely, vibration components other than the parallel displacement of the shaft can be measured.

The flat spring 4 provided with a first spring constant varying mechanism 6A is provided on the support structure 2, and the cartridge body 13 of the cartridge 10 is elastically supported by the flat spring 4.

The first spring constant varying mechanism 6A is provided with a pair of support pillars 61 and 61, upper ends of which support the spring elements 4A on both left and right sides of the flat spring 4, such that the spring elements 4A can slide in the horizontal direction. Each of the support pillars 61 is provided so as to be movable in the horizontal direction X (the left to right direction in FIG. 3) with respect to the support structure 2, by an appropriate movement means. Specifically, a guide rail 2A is provided on the support structure 2 and the pair of support pillars 61 are guided along the guide rail 2A, which allows the support pillars 61 to be set in predetermined positions in the movement direction (the horizontal direction X).

Gripping rollers 62, which grip the flat spring 4 from above and below such that they can roll, are provided on the upper ends of the pair of support pillars 61. Moving the support pillars 61 allows positions (support points P1 and P2) at which the flat spring 4 is gripped to be displaced along the horizontal direction X. In other words, areas where spring elasticity of the spring elements 4A functions, namely, a spring length L between the left and right support points P1 and P2 can be changed by the displacement of the support pillars 61, and thus, the spring constant and the supporting stiffness of the flat spring 4 can be changed. In a case where the spring length L is long, the deflection of the spring becomes larger and the supporting stiffness becomes lower, and thus the spring constant becomes smaller. In another case where the spring length L is short, the deflection of the spring becomes smaller and the supporting stiffness becomes greater, and thus the spring constant becomes larger.

A plural (two) dampers 5 are provided between the support structure 2 and the flat spring 4, and between the pair of support pillars 61. This pair of dampers 5 are fixed to portions of a bottom surface 4a of the flat spring 4, excluding the spring elements 4A, namely, at boundary positions 4b and 4c between the spring elements 4A and the intermediate component 41 in a plan view.

In the vibration measurement device 1A according to the first working example structured above, after setting the cartridge 10 to be supported elastically with respect to the support structure 2, which is rigidly fixed, via the flat spring 4, the balancing vibration of the cartridge 10 for variable operating speed can be measured by rotating the cartridge 10 about the axial line and detecting the vibration of the cartridge 10.

In this case, the cartridge 10 is flexibly supported by the flat spring 4 and the elastic property, namely, the spring constant of the flat spring 4 is variable by changing the support points P1 and P2 of the spring elements 4A, as a result of moving the support pillars 61 of the first spring constant varying mechanism 6A. Similarly to the above-described embodiment, the S/N ratio can be improved by changing this elastic property, and, as illustrated in FIG. 2, the same vibration measurement device 1A can continuously perform the balancing vibration measurement of the same cartridge 10 with both the different spring constants, namely, vibration measurement of rigid rotor balancing with low-speed operation on the elastic support in which the spring constant does not function (the spring constant K0) and vibration measurement of flexible rotor balancing with high-speed operation under environmental conditions simulating the practical machine (the spring constant K1).

This configuration allows balance adjustments to be appropriate for both of the low-speed and the high-speed operations, the accuracy of the balancing vibration measurement to be improved and the unbalance of the cartridge 10 to be reduced.

In this way, both a workpiece on which rigid rotor balancing only should be conducted (whose rated speed is lower than the speeds which generates elastic modes) and a workpiece on which flexible rotor balancing also should be conducted (models whose operating speeds generate elastic mode of them on practical vehicles) can be conducted for vibration measurement on the same production line. Thus, facilities can be reduced and productivity can be improved.

Thus, in the first working example also, the balancing vibration measurement for both the low-speed operation and the high-speed operation can be performed using the same vibration measurement device 1A, the accuracy of the vibration measurement can be improved, and the unbalance of the cartridge 10 can be corrected and reduced.

Note that, in the first working example, the dampers 5, which are damping devices, are provided, but these dampers may be omitted.

Second Working Example

Figure 4:
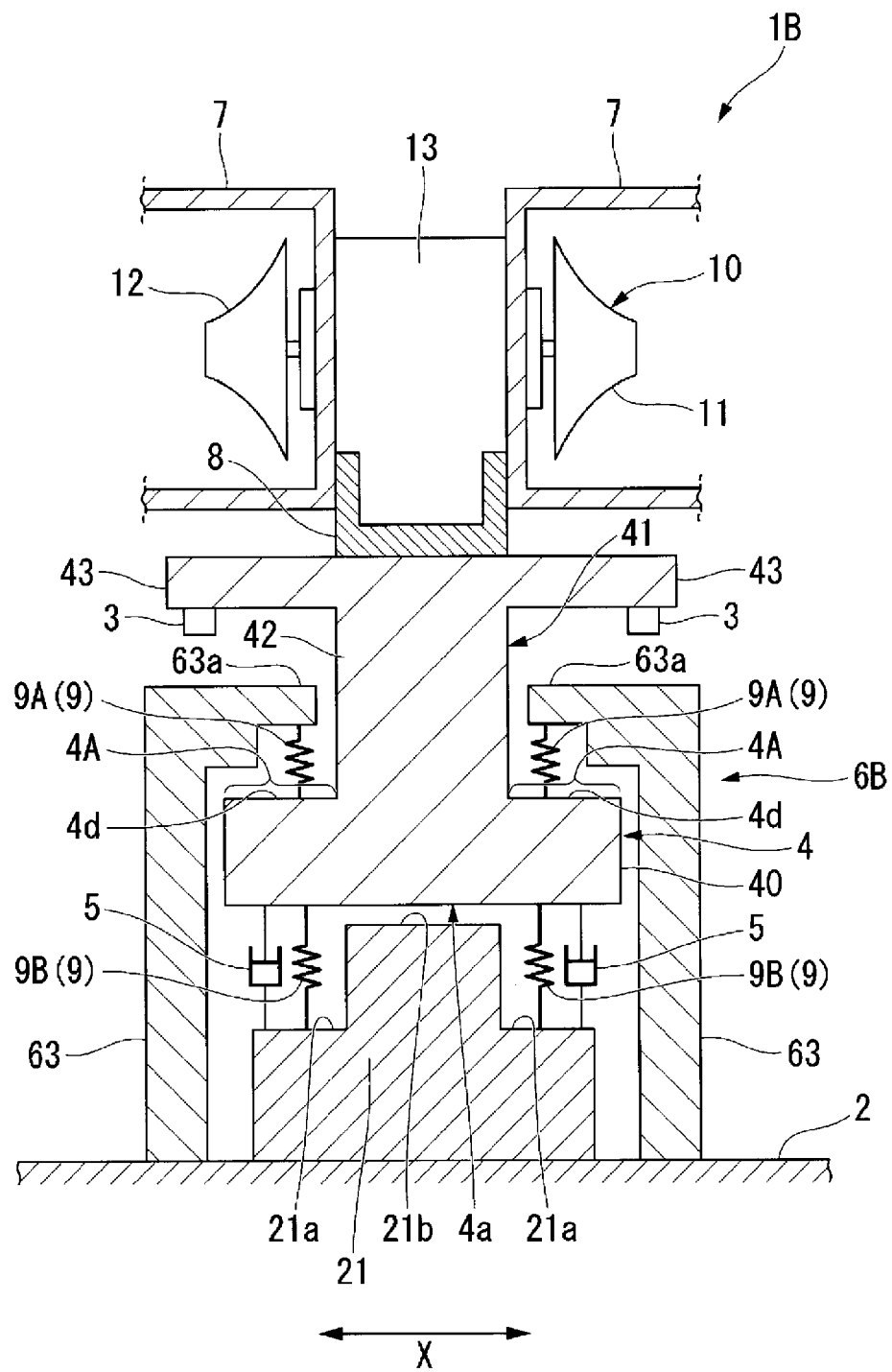
FIG. 4 is a schematic diagram illustrating a composition of a vibration measurement device according to a second working example.

As illustrated in FIG. 4, a vibration measurement device 1B for the high-speed rotating machines according to a second working example is provided with a second spring constant varying mechanism 6B that uses nonlinear springs 9 to change the spring constant through the compression of the nonlinear springs 9. Here, the cartridge 10, the acceleration sensors 3, the flat spring 4, the scroll 7, and the clamp 8 are the same as those of the above-described first working example and a detailed description thereof is omitted here. Attached positions of the acceleration sensors 3 to the flat spring 4 are also the same as those of the first working example.

The second spring constant varying mechanism 6B is provided on the support structure 2. The second spring constant varying mechanism 6B is provided with a pair of support pillars 63 and 63 that are provided outer side in the horizontal direction X of the flat spring 4 on the support structure 2 such that the support pillars 63 and 63 can move in the up and down directions, a base 21 that is provided between the support pillars 63 and 63 such that the base 21 can move in the up and down directions, and the nonlinear springs 9 (9A and 9B) that are provided between the support pillars 63 and the flat spring 4 and between the base 21 and the flat spring 4. Note that, in FIG. 4, means of movement in the horizontal direction is omitted.

Upper locking parts 63a are provided projecting in the horizontal direction X and facing each other, from the respective upper ends of the support pillars 63. The first nonlinear springs 9A, which urge both the upper locking parts 63a and the spring elements 4A, are provided between the upper locking portions 63a and top surfaces 4d of the spring elements 4A.

The support pillars 63 are provided, for example, with an up-and-down movement mechanism (not illustrated), such as a slide mechanism or a jack, and are structured such that the upper locking parts 63a of the support pillars 63 can be moved to a desired height position and then fixed.

The base 21 has lower locking parts 21a on a bottom surface of a stepped portion formed in an upper end outer peripheral edge thereof. The second nonlinear springs 9B and 9B, which urge both the lower locking parts 21a and the spring elements 4A, are provided between the lower locking parts 21a and the bottom surfaces 4a of the spring elements 4A, along with a pair of the dampers 5 and 5 (the damping devices) that are provided further to the outside than the second nonlinear springs 9A and 9B.

The base 21 is provided, for example, with an up-and-down movement mechanism (not illustrated), such as a slide mechanism or a jack, and is structured such that the lower locking parts 21*a* of the base 21 can be moved to a desired height position and then fixed.

Note that an upper surface 21*b* of the base 21 is positioned above the positions of the lower locking parts 21*a* with respect to the bottom surfaces 4*a* of the spring elements 4A, and before the second nonlinear springs 9B are completely compressed, the upper surface 21*b* can come into contact with the bottom surface 4*a* of the flat spring 4 to rigidly support the cartridge 10 via the flat spring 4 and the clamp 8.

The nonlinear springs 9A and 9B are known nonlinear springs whose spring constant changes with respect to their strains, for example, conical coil springs, unequal pitch springs, tapered coil springs and the like are applicable.

In the vibration measurement device 1B according to the second working example, the spring characteristics of the flat spring 4 can be performed by the compression of the nonlinear springs, and the spring constant can be changed. For example, compressing the nonlinear springs 9A and 9B allows the stiffness of the flat spring 4 to be increased.

Note that, in the second working example, the dampers 5, which are damping devices, are provided, but these dampers may be omitted.

Further, in the second working example, the acceleration sensors 3 are fixed to the flat spring 4, but they are not limited to these positions and can also be attached to the clamp 8 that rigidly supports the rotating machine, for example. In this case, the vibration of the rotating machine can be more accurately measured than a case in which the rotating machine is supported with line contacts by the scrolls.

Third Working Example

Figure 5:
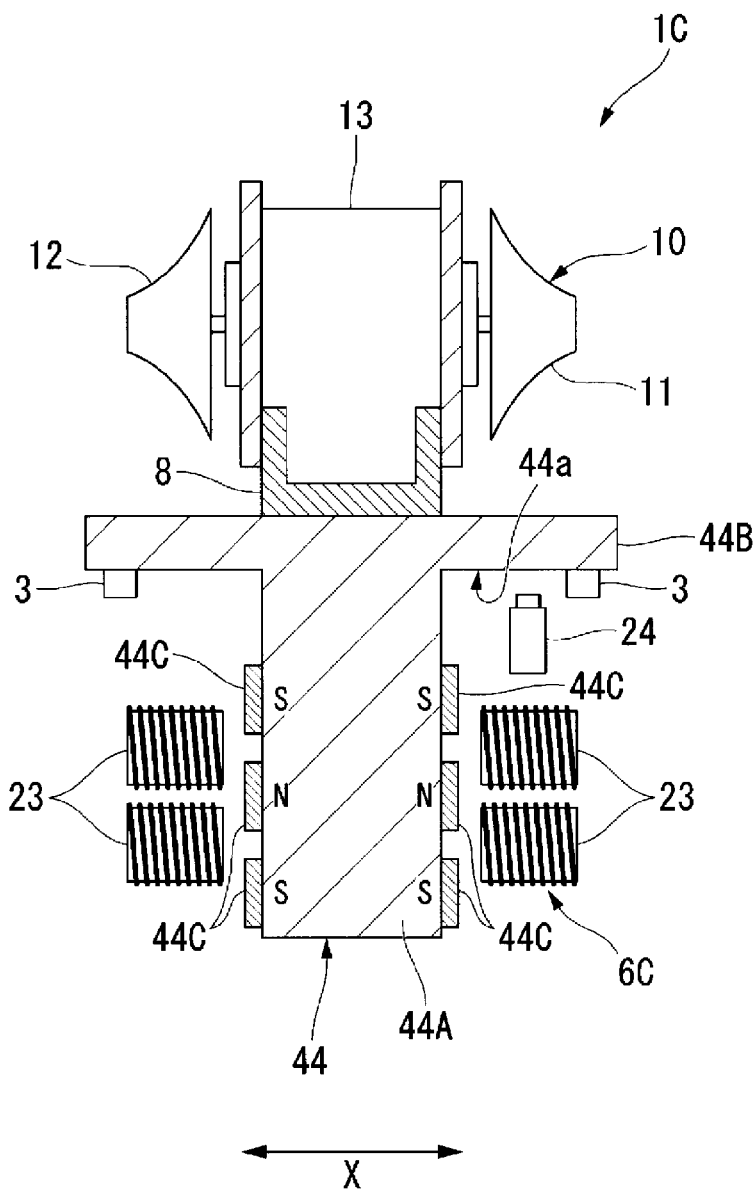
FIG. 5 is a schematic diagram illustrating a composition of a vibration measurement device according to a third working example.

As illustrated in FIG. 5, a vibration measurement device 1C for the high-speed rotating machines according to a third working example is provided with a third spring constant varying mechanism 6C that uses electromagnets 23 to electromagnetically change the spring characteristics (the spring constant) of an electromagnetic spring 44 (the elastic support portion).

The electromagnetic spring 44 is provided with a spring body 44A having an appropriate number of metal plates 44C attached to the lateral surface thereof, and projecting portions 44B that protrude outward in the horizontal direction from an upper end of the spring body 44A. The acceleration sensors 3 are provided on bottom surfaces of the projecting portions 44B at the projecting ends thereof.

A plurality of the electromagnets 23 are arranged in positions facing the metal plates 44C. A measurement unit 24 for measuring a displacement, a speed and an acceleration of the projecting portions 44B is provided below a bottom surface 44*a* of the projecting portion 44B. Note that the metal plates 44C, the electromagnets 23, and the measurement unit 24 correspond to the third spring constant varying mechanism 6C.

In the vibration measurement device 1C according to the third working example, a magnitude of a restoring force is applied in advance with reference to measured values of the acceleration, the speed, the displacement and the like measured by the measurement unit 24, and the spring constant can be changed by changing the magnetic field of the electromagnets 23 with respect to the metal plates 44C. Specifically, the spring constant can be increased by increasing the magnetic field, and the spring constant can be reduced by lowering the magnetic field. Further, since it is electrically controlled, the quick change of characteristics can be performed, and the accuracy of changing the spring constant can be enhanced.

Further, the vibration detection unit is not limited to the acceleration sensor 3, and may be, for example, a displacement sensor or the like.

Next, an alternative example of the above-described third working example is described below with reference to FIG. 6.

Figure 6:
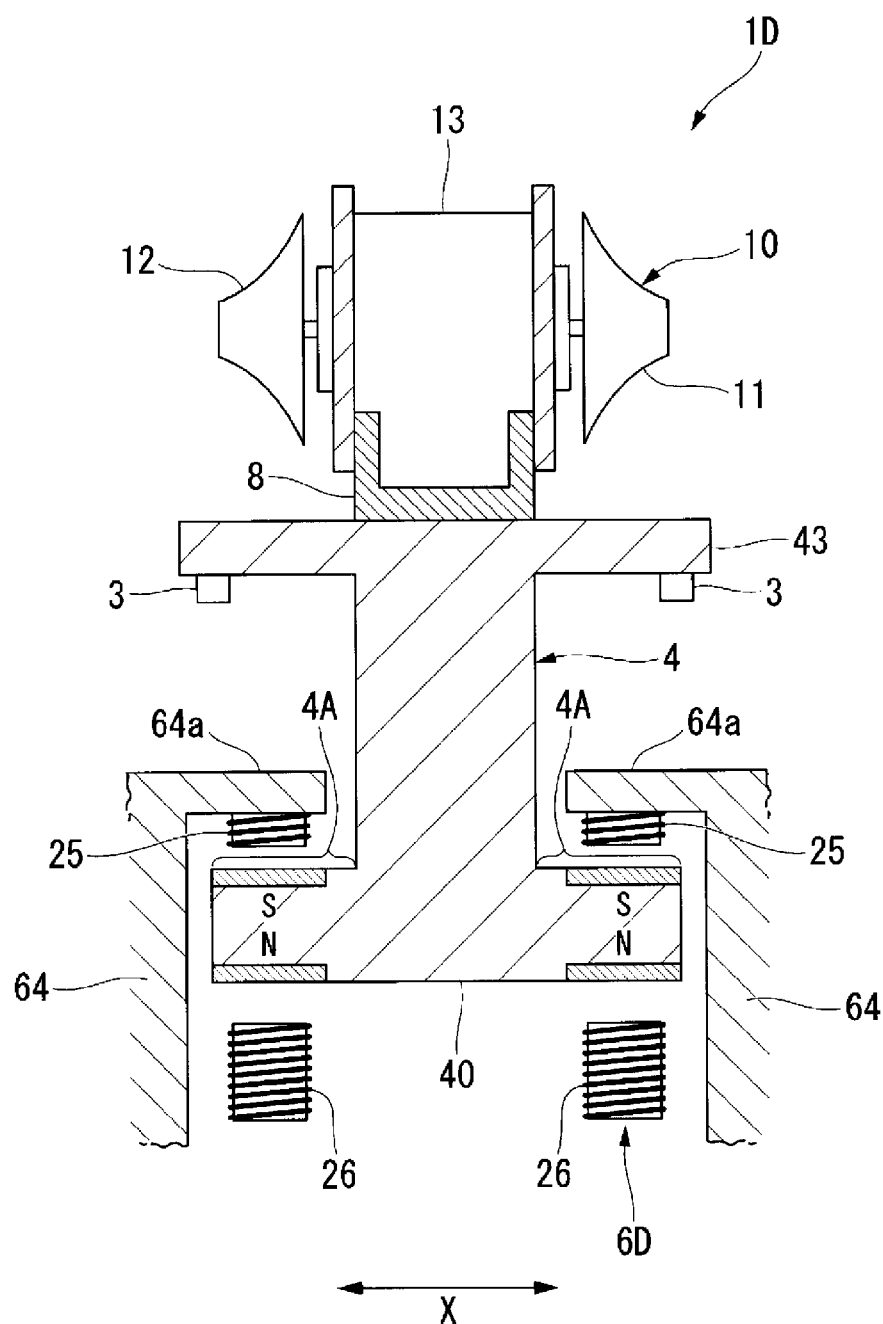
FIG. 6 is a schematic diagram illustrating a composition of a vibration measurement device according to an alternative example of the third working example.

In a fourth spring constant varying mechanism 6D of a vibration measurement device 1D illustrated in FIG. 6, with respect to the flat spring 4 (the elastic support portion) of the first working example, support pillars 64 are provided with projecting pieces 64*a* covering areas above the spring elements 4A of the spring body 40. Coils 25 that face the spring elements 4A are attached to bottom surfaces of the projecting pieces 64*a*. Electromagnets 26 are provided below the spring elements 4A, with a space therebetween.

For the vibration measurement device 1D according to the alternative example, the spring constant can also be changed by changing a voltage applied to the coils 25. Note that, in the vibration measurement device 1C illustrated in FIG. 5, the measurement unit 24 is provided, but in this alternative example, control can be performed without the measurement unit 24.

Fourth Working Example

Figure 7:
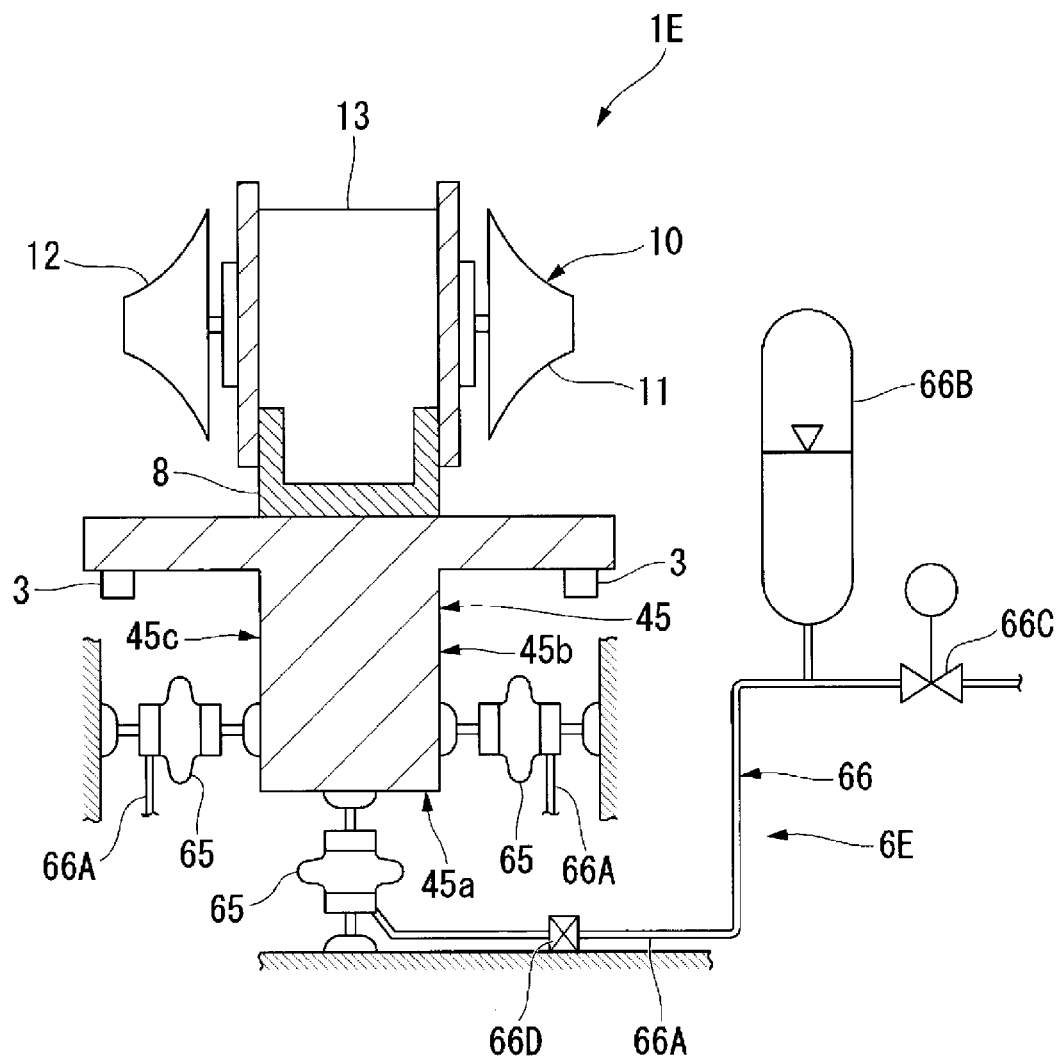
FIG. 7 is a schematic diagram illustrating a composition of a vibration measurement device according to a fourth working example.
Figure 8:
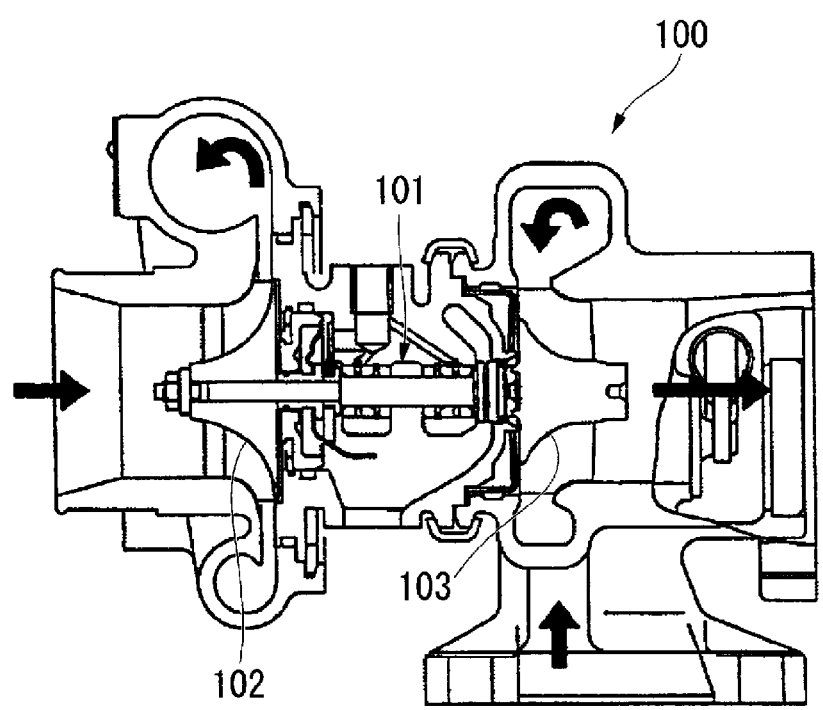
FIG. 8 is a vertical cross-sectional view illustrating a composition of a conventional turbocharger.

A vibration measurement device 1E according to a fourth working example illustrated in FIG. 7 is provided with fifth spring constant varying mechanism 6E that changes damping characteristics (the spring constant) of a spring body 45 (the elastic support portion), by adjusting the fluid pressure of air suspension 65.

The fifth spring constant varying mechanism 6E is provided with the air suspension 65 that has a compression function and that are provided on each of a bottom 45*a* and both of right and left side surfaces 45*b* and 45*c* of the spring body 45, and gas pressure adjustment units 66 provided so as to be able to adjust gas pressures of the air suspension 65.

Each air suspension 65 is connected to a pipe line 66A of the individual gas pressure adjustment unit 66. Note that, in FIG. 7, only the gas pressure adjustment unit 66 that is connected to the bottom 45*a* of the spring body 45 is illustrated, and the gas pressure adjustment units 66 connected to the side surfaces 45*b* and 45*c* are omitted.

Each of the gas pressure adjustment units 66 is provided with the pipe line 66A to which gas (a fluid) is supplied from a fluid supply unit (not illustrated), such as a compressor or a tank, a pressure accumulator 66B provided midway along the pipe line 66A, a regulating valve 66C disposed on the upstream side of the pressure accumulator 66B in the pipe line 66A, and an orifice 66D provided between the pressure accumulator 66B and the air suspension 65.

In a case where the supplied gas is a compressible fluid, a chamber is used as the pressure accumulator 66B, and the pressure accumulator 66B can adjust the pressure of the charged gas to apply the supporting stiffness of the air suspension 65.

In another case where the supplied gas is an incompressible fluid, spring characteristics can be applied to the air suspension 65 by installing an accumulator as the pressure accumulator 66B. Specifically, spring characteristics can be changed by accumulator settings and damping characteristics can be changed by setting losses of the pipeline flows.

The orifice 66D can change the damping characteristics of the air suspension 65 by changing the flow channel loss inside the pipe line 66A.

Using an ER fluid (an electrorheological fluid) that can change apparent viscosity with the application of an electric field or an MR fluid (a magnetorheological fluid) that can change apparent viscosity with the application of a magnetic field as the working fluid also allows the damping characteristics to be changed by electromagnetic control.

In the vibration measurement device 1E for the high-speed rotating machines of the present fourth working example, adjusting the gas pressure of the air suspension 65 by using the gas pressure adjustment units 66 allows the damping characteristics of the spring body 45 to be changed and the spring constant to be changed. Further, because compressed air is used to accelerate the turbocharger, a source of the air can be used offering the advantage of a simple and convenient mechanism.

In addition, in the fourth working example, a cylinder filled with fluid (air, oil) may be adopted, for example, in place of the air suspension 65 which is used as expanding devices.

While some embodiments of the vibration measurement device and method for the high-speed rotating machines according to the present invention has been described above, the present invention is not limited to the above-described embodiment allowing suitable changes without deviation from the spirit and scope of the present invention.

INDUSTRIAL APPLICABILITY

According to the vibration measurement device and method for the high-speed rotating machines of the present invention, balancing vibration measurement for both of the low-speed and high-speed operations can be conducted using the same vibration measurement device, the accuracy of the vibration measurement can be improved and the unbalance of the rotating machine can be reduced.

REFERENCE SIGNS LIST 1, 1A to 1E Vibration measurement device
2 Support structure
3 Acceleration sensor (vibration detection unit)
4 Flat spring (elastic support portion)
4A Spring element
5 Damper (damping device)
6, 6A-6E Spring constant varying mechanism
7 Scroll
8 Clamp
9 Nonlinear spring
10 Cartridge (rotating machine)
11, 12 Rotor
44 Electromagnetic spring (elastic support portion)
45 Spring body (elastic support portion)
65 Air suspension
D Damping device
K Elastic support portion
X Horizontal direction

The invention claimed is:

1. A vibration measurement device for a turbocharger for measuring balancing vibration of the rotating machines which have variable operating speed, the rotating machines being a cartridge including a rotor that rotates about an axial line and a cartridge body that rotatably supports the rotor, the vibration measurement device comprising:
a rigidly fixed support structure;
a vibration detection unit that detects vibration of the rotating machines; and
an elastic support portion that elastically supports the rotating machines with respect to the support structure and has a variable spring constant of the elastic support, wherein
the elastic support portion is configured to change the spring constant while the rotor is rotating,
the elastic support portion is a flat spring,
a pair of support pillars supporting the flat spring are provided on the rigidly fixed support structure,
the pair of support pillars slidably support the flat spring in a horizontal direction and are configured to displace a support position of the flat spring, and
the spring constant is changed by displacing the support position.

2. The vibration measurement device for the turbocharger according to claim 1, further comprising a damping device that provides damping for the rotating machine with respect to the support structure.

3. The vibration measurement device for the turbocharger according to claim 1, wherein the elastic support portion is provided with a clamp that supports the rotating machine in one of a mechanical manner or an electrical manner.

4. The vibration measurement device for the turbocharger according to claim 3, wherein the vibration detection unit is provided on the clamp.

5. A vibration measurement method for a turbocharger for measuring balancing vibration of a rotating machine whose operating speed is variable, the rotating machine being a cartridge including a rotor that rotates about an axial line and a cartridge body that rotatably supports the rotor, the vibration measurement method comprising the steps of:
elastically supporting the rotating machine with respect to a rigidly fixed support structure, via an elastic support portion which has a variable spring constant;
rotating the rotating machine about an axial line; and
detecting vibration of the rotating machine, wherein
the elastic support portion is configured to change the spring constant while the rotor is rotating,
the elastic support portion is a flat spring,
a pair of support pillars supporting the flat spring are provided on the rigidly fixed support structure,
the pair of support pillars slidably support the flat spring in a horizontal direction and are configured to displace a support position of the flat spring, and
the spring constant is changed by displacing the support position.

6. The vibration measurement device for the turbocharger according to claim 1, wherein the elastic support portion is provided with a clamp that supports the rotating machine in one of a mechanical manner or an electrical manner.

7. A vibration measurement device for a turbocharger for measuring balancing vibration of the rotating machines which have variable operating speed, the rotating machines being a cartridge including a rotor that rotates about an axial line and a cartridge body that rotatably supports the rotor, the vibration measurement device comprising:
a rigidly fixed support structure;
a vibration detection unit that detects vibration of the rotating machines; and
an elastic support portion that elastically supports the rotating machines with respect to the support structure and has a variable spring constant of the elastic support, wherein
the elastic support portion is configured to change the spring constant while the rotor is rotating, the elastic support portion is a flat spring,
a base which is movable in an up and down direction, and a support pillar are provided on the rigidly fixed support structure,
a first nonlinear spring is provided between the support pillar and the flat spring,
a second nonlinear spring is provided between the base and the flat spring,
the spring constant is changed by compressing the first and second nonlinear springs by a movement of the base in the up and down direction.

\* \* \* \* \*